Jan. 26, 1943.    H. E. STOVER    2,309,548
APPARATUS FOR SEALING CONTAINERS
Filed Feb. 16, 1940    6 Sheets-Sheet 3

INVENTOR
Harry E. Stover.
BY Corbett + Mahoney
ATTORNEYS

Patented Jan. 26, 1943

2,309,548

UNITED STATES PATENT OFFICE 2,309,548

APPARATUS FOR SEALING CONTAINERS

Harry E. Stover, Leonia, N. J., assignor to Anchor-Hocking Glass Corporation, Lancaster, Ohio, a corporation of Delaware Application February 16, 1940, Serial No. 319,312

25 Claims. (Cl. 226—80)

My invention relates to an apparatus for sealing containers. It has to do, more particularly, with an apparatus for applying closures to containers, such as food containers and including jars, bottles, cans, et cetera, and sealing them on the containers and for producing a partial vacuum in the upper ends of the containers.

One of the objects of my invention is to provide a greatly simplified apparatus for applying and sealing closures on containers and for creating an effective vacuum in the space at the upper end of the container, between the closure and the contents of the container, which will aid in preventing spoilage of the contents and will also aid in keeping the closure in position on the container.

Another object of my invention is to provide apparatus of the type indicated which is of such a nature that the closure and the upper end of the container and the head space between the contents and the closure will be sterilized during the sealing operation.

Another object of my invention is to provide an apparatus of the type indicated which will vacuumize and seal the container quickly and effectively.

Another object of my invention is to provide a machine of the type indicated which is of a very simple structure and, therefore, can be built at a relatively low cost, which will occupy a small amount of space, and which is composed of a minimum number of parts tending to wear or become inoperative.

Another object of my invention is to provide a machine of the type indicated which may be adjusted readily to operate upon containers of various sizes.

Another object of my invention is to provide a machine which will be continuous in operation and which will perform its operation without handling of the containers by an operator.

Another object of my invention is to provide a machine of the type indicated which has sealing means actuated by fluid pressure and which is of such a nature that although fluid of low pressure may be employed, a high sealing pressure may be obtained.

Another object of my invention is to provide a machine of the type indicated which has means associated with the sealing means for limiting the sealing pressure to a predetermined maximum so as to prevent injury to the container being sealed, said means being adjustable to vary the maximum pressure produced.

Another object of my invention is to provide a machine of the type indicated wherein the sealing means embodies a sealing head adapted to be moved relative to the container, means being provided for adjusting the stroke or extent of travel of said sealing head.

Another object of my invention is to provide a machine of the type indicated wherein the sterilizing and vacuumizing is accomplished with steam and wherein the sealing means is also operated by steam, which makes it possible to provide a very simple and compact machine.

Another object of my invention is to provide a machine of the type indicated wherein the closure applying and sealing means and the sterilizing and vacuumizing means are arranged in the form of a single unit which may be easily and quickly attached to any suitable type of conveyer unit for bringing containers into association therewith.

In its preferred form my invention contemplates the provision of a simple apparatus for applying closures to and sealing them on various containers such as jars, bottles, cans, etc. My apparatus is in the form of a very compact structure which may be associated with any suitable type of conveyer unit, which is adapted to bring the containers into association therewith. My apparatus is preferably disposed in superimposed relationship to a continuously moving conveyer upon which the filled containers are placed indiscriminately. This conveyer preferably has means associated therewith for centering and maintaining the containers centered on the conveyer.

My apparatus includes a cap feeding and applying unit, where caps or other closures are loosely positioned on the upper ends of the containers moved into association therewith by the conveyer. Directly adjacent the cap feeding and applying unit, I provide a sealing head. The conveyer moves the containers, with caps loosely applied thereto, into association with this sealing head. The sealing head is spaced slightly above the upper ends of the containers and fluid-actuated means is associated therewith for forcing it downwardly whenever a container, having a cap properly associated therewith, moves beneath the sealing head. This will force the cap downwardly into frictional engagement with the upper end of the container. The fluid-actuated means is of such a structure that although low pressure fluid may be used, a high sealing pressure will be obtained. I preferably provide means associated with the sealing head for limiting the pressure produced thereby on the container to a predetermined maximum. This means may be quickly and easily adjusted to vary the maximum pressure produced. Also, I preferably provide means associated with the sealing head for adjusting its stroke or extent of its downward travel.

The sealing head has means associated therewith for automatically lifting the cap from the upper end of each container and for injecting steam into the head space, at the upper end of each container, to displace the air therefrom, both of these operations being performed substantially simultaneously just prior to the sealing of the cap on the container. After the cap is sealed on the container, the steam previously injected into the head space of the container will condense, creating an effective vacuum within the container which will aid in holding the cap in position and will also aid in preventing spoilage of the contents of the container. Since I provide steam for sterilizing and vacuumizing, it is also desirable to use steam as the fluid for operating the sealing head.

During the sealing operation, the container is stationary and the conveyer preferably continues to move therebeneath. However, as soon as the pressure produced by the sealing head is eliminated, the container will again be moved by the conveyer away from the sealing head. The cap feeding and applying unit is operatively connected to the mechanism for operating the sealing head, so that each time the sealing head is actuated, a cap is fed from the cap feeding unit into position to be engaged by the next container, moved by the conveyer into association therewith.

It will be understood that if the contents of the container is porous, air will not only be removed from the head space above the contents but also from the contents.

Various other objects and advantages will be apparent from the following description.

The preferred embodiment of my invention is illustrated in the accompanying drawings, wherein similar characters of reference designate corresponding parts and wherein.

With reference to the drawings, I have illustrated a machine which comprises generally a conveyer unit 1, a cap feeding and applying unit 2 and a sealing head unit 3.

The conveyer unit 1 may be of any suitable type. For example, it may be of the type disclosed in the co-pending application of William D. Bell on Apparatus for sealing containers, Serial No. 314,299, filed January 17, 1940. However, it is to be understood that my apparatus may be associated with any suitable type of conveyer unit. The conveyer unit preferably embodies means for continuously moving the containers into proper association with the units 2 and 3, including means for centering the containers relative to said units.

Figure 7:
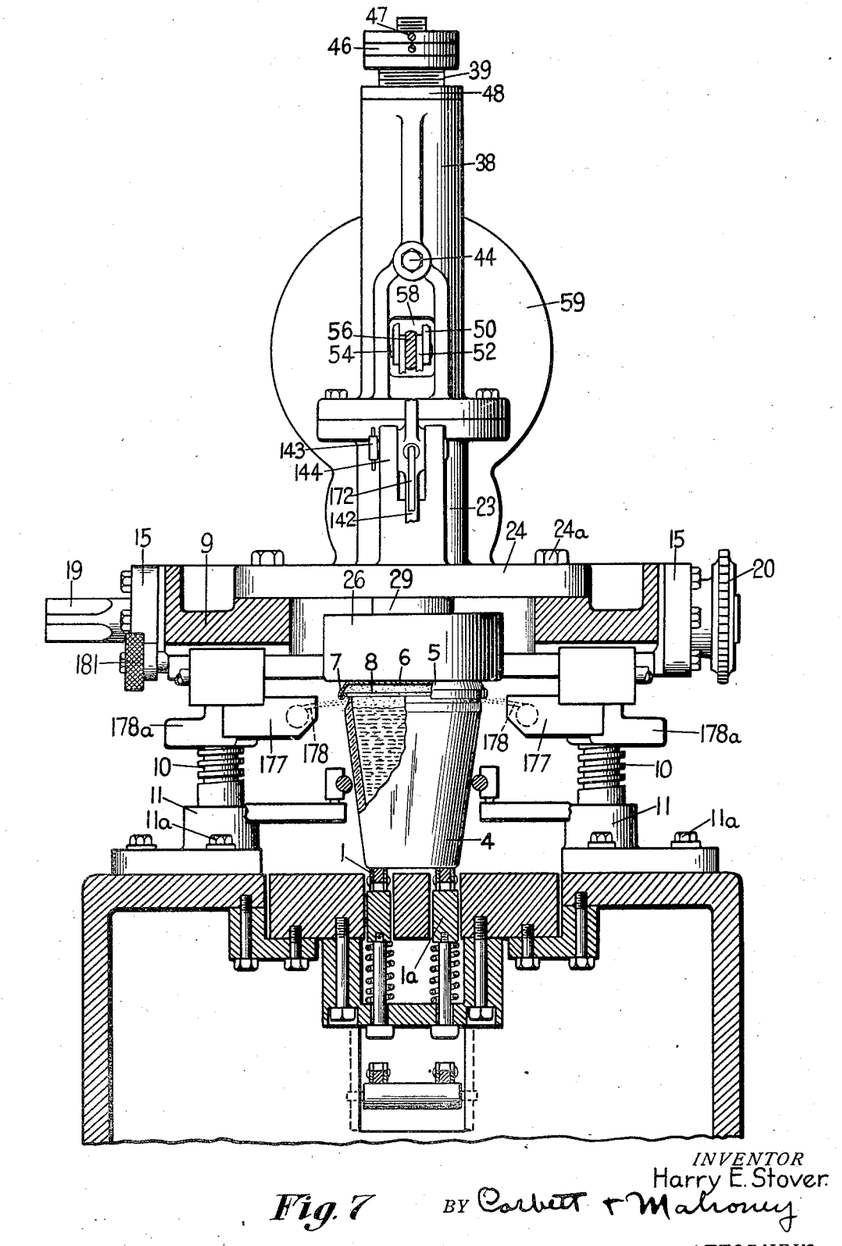
Figure 7 is a transverse vertical sectional view taken substantially along line 7—7 of Figure 1 but being enlarged.
Figure 8:
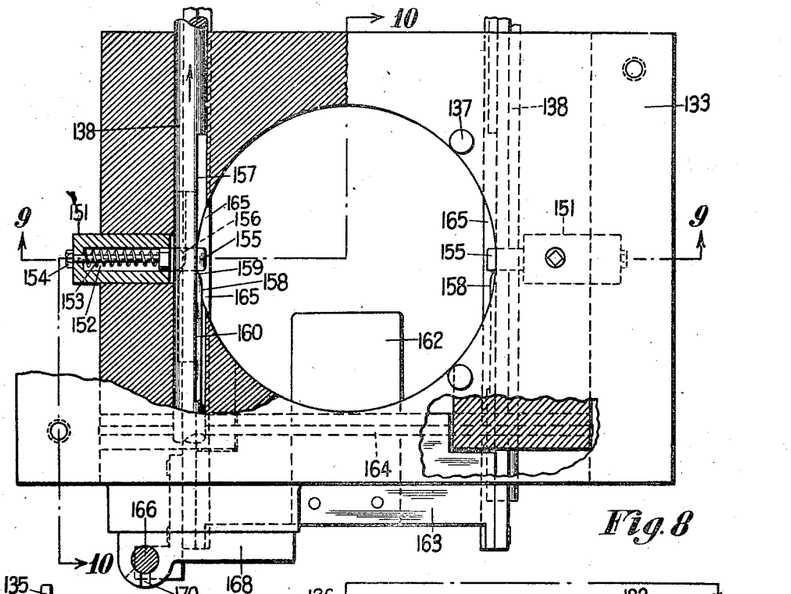
Figure 8 is a view partly in horizontal section and partly in plan taken substantially along line 8—8 of Figure 9 illustrating the cap feeding and applying unit which I provide.
Figure 9:
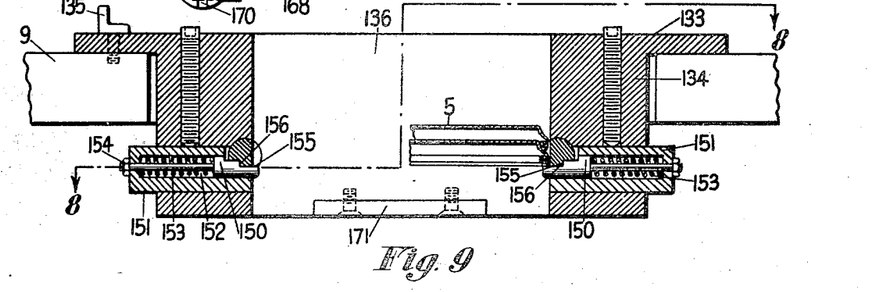
Figure 9 is a vertical sectional view taken substantially along line 9—9 of Figure 8.
Figure 10:
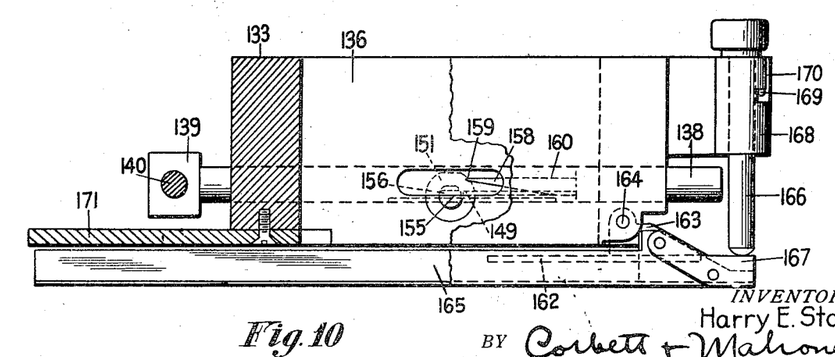
Figure 10 is a view, partly in side elevation and partly in section taken substantially along line 10—10 of Figure 8.

My invention is not limited to use with any particular type of container and cooperating cap but for illustrative purposes I have shown in Figure 7 a tumbler 4 adapted to receive the cap 5 on its upper end. This cap preferably embodies a substantially disk-like portion 6 which has a depending annular skirt 7 which carries an annular gasket 8 therewithin. When the cap is forced downwardly onto the upper end of the container, the frictional contact of the gasket with the upper end of the container will aid in maintaining the cap in position and will seal the cap on the container.

Figures 1, 2:
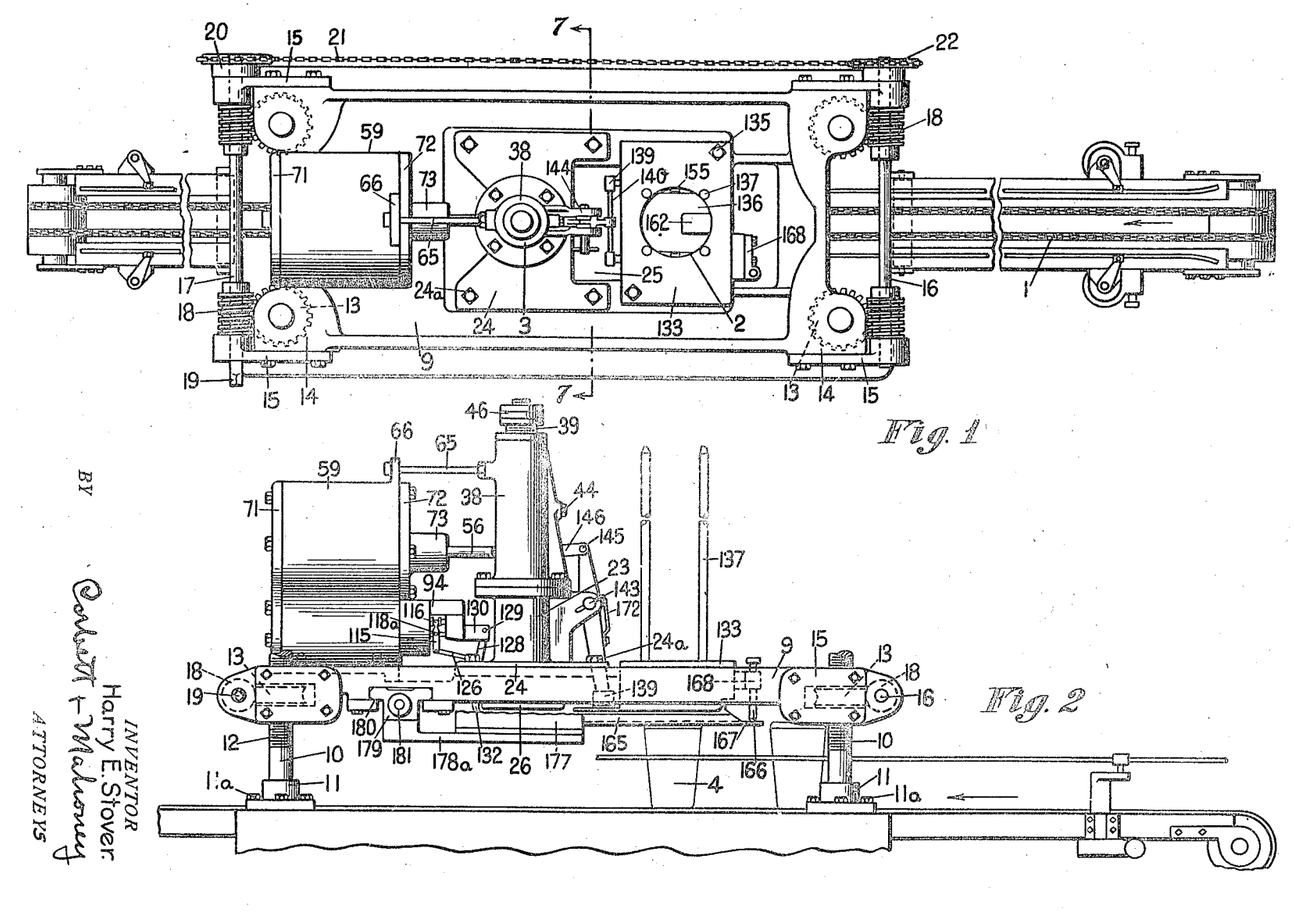
Figure 1 is a plan view of a machine constructed in accordance with my invention.
Figure 2 is a side elevational view of the main portion of the machine shown in Figure 1.

The containers 4 are placed indiscriminately on the conveyer and are moved in the direction of the arrows (Figures 1 and 2) by the conveyer. The containers are centered thereon in the manner described in said co-pending application Serial No. 314,299. They are first carried to the cap feeding and applying unit 2. This unit is of such a type that it will apply a cap loosely to the upper end of the container. After the container passes the unit 2, it passes to the sealing head unit 3. This sealing head unit 3 is adapted to displace the air from the head space and to sterilize such space and the cap before the sealing operation.

The units 2 and 3 are disposed directly adjacent each other. They are both supported by a horizontally disposed plate 9. The plate 9 is supported at a point spaced above the conveyer unit 1 by means of four vertically disposed non-rotatable posts 10 which are disposed at each corner of the plate. Each of these posts 10 is provided with a base portion 11 on its lower end which is suitably secured, as by screw bolts 11a, to a portion of the conveyer unit 1. The upper portion of each of these posts is threaded, as indicated at 12. Each of the posts has an internally threaded worm gear 13 mounted on the threaded portion 12 thereof. Each of these worm gears is disposed directly beneath and engages a corner extension 14 of the plate 9. Bolted to the side of each of these corner extensions 14 is a bracket 15. The pair of brackets 15 at the right hand end of the plate 9 (Figure 1) rotatably support a horizontally disposed worm shaft 16. The pair of brackets 15 at the other end of the plate 9 rotatably support a horizontally disposed worm shaft 17. Each of the worm shafts 16 and 17 carries a pair of worms 18 which engage the adjacent worm gears 13. The worm shaft 17 is provided with an angular end 19 for receiving a crank by means of which it may be rotated. In order to rotate the shaft 16 simultaneously with the shaft 17, the shaft 17 is provided on its opposite end with a sprocket 20 keyed thereon. This sprocket has a chain 21 passing therearound which also passes around a sprocket 22 keyed on the corresponding end of the shaft 16.

Thus, it will be apparent that when the shaft 17 is rotated, the shaft 16 will be rotated simultaneously and to the same extent. Consequently, by rotating shaft 17, all of the worm gears 13 will be caused to rotate. Since these gears are threaded on the posts 10, they will be moved vertically on the posts. Furthermore, since the gears are in engagement with lower surfaces of the plate 9, the plate 9 will be moved vertically in accordance with the vertical movement of the gears. Thus, the plate 9 may be adjusted vertically to position the units 2 and 3 at the proper height above the conveyer unit, depending upon the height of the containers to be sealed. It will be noted that all portions of my apparatus are carried by the plate 9. Consequently, it is in the form of a unitary structure which may be readily associated with any suitable type of conveyer unit.

The sealing head unit 3 is illustrated best in Figures 1, 2, 3, 4 and 7. It comprises a vertically disposed cylindrical housing portion 23 which has a base portion 24 that is bolted by means of bolts 24a to the upper surface of the plate 9. Beneath the base portion 24 the plate 9 is provided with a large opening 25, in order to permit vertical movement of the sealing head 26. This sealing head embodies a substantially cylindrical portion of non-magnetic metal which is carried on the lower end of a plunger 27.

The sealing head 26 is provided with a recess 28 in its upper surface which receives the enlarged lower end 29 of the plunger 27. The plunger 27 is provided with a vertically disposed bore 30 which has an interiorly threaded lower end that receives the threaded upper portion of a bolt 31. This bolt passes upwardly through a centrally disposed opening 32 in member 26 which is enlarged at its lower end to receive the head 33 of the bolt. The bolt 31 will maintain the head 26 in position on the lower end of the plunger 27. A pin 34 is disposed in aligning openings in the member 26 and enlarged portion 29 of the plunger to prevent relative rotation of these members.

In order to normally maintain the plunger 27 in its uppermost position I provide the following structure. A pin 35 is carried by the housing portion 23 and extends transversely thereof and through a vertically disposed slot 36 formed in the plunger 27. A compression spring 37 has its lower end resting on this pin 35 and its upper end engaging with the upper end of the bore 30. Thus, this spring 37 normally tends to force the plunger 27 upwardly until the enlarged portion 29 thereof contacts with the lower end of the housing portion 23.

Above the housing portion 23 is a housing portion 38 which is of tubular form and which has a flange on its lower end that is bolted to a flange on the upper end of housing portion 23, as indicated best in Figure 7. Threaded into the upper end of the housing portion 38 is a collar 39. This collar 39 has a plunger 40 mounted therein for vertical movement. This plunger has a peripheral flange 41 on its lower end which fits tightly within the housing portion 38. Between the lower end of the collar 39 and the upper surface of the flange 41 and in surrounding relationship to the plunger 40 is a compression spring 42. The spring 42 normally forces the plunger downwardly. A stop portion 43, formed on the inner end of a bolt 44 threaded through the housing portion 38, is provided for preventing excessive downward movement of plunger 40 to a point where the links of the toggle approach each other too closely. The upper end of the plunger 40 is threaded, as indicated at 45, and receives threaded collars 46 which bear against the upper end of the collar 39. The collars 46 are held in adjusted position by means of set screws 47. By rotating the collars 46, the distance between the flange 41 and the collar 39 may be varied and, consequently, the downward force exerted by the spring 42 on the plunger may be varied. By rotating the collar 39 in the housing portion 38, the entire unit including plunger 40, spring 42, collar 39 and collars 46 may be adjusted axially of the housing. The two adjustments just described are provided for a purpose to be explained later. The collar 39 may be held in any adjusted position by means of a lock nut 48 threaded on collar 39 and held in adjusted position by set screw 48a. The lower end of plunger 40 may or may not be in contact with stop 43, as shown, depending upon the position of the plunger unit, which is determined by adjustment of member 39.

It will be apparent that the plungers 40 and 27 are disposed in axial alignment. It will also be apparent that the lower end of the plunger 40 is spaced above the upper end of plunger 27. Between these plungers and within the housing portions 38 and 23, a toggle joint 49 is disposed. One link 50 of the toggle joint extends upwardly and has its upper end pivotally connected, as at 51, to the bifurcated lower end of the plunger 40. The other link 52 has its lower end pivotally connected, as at 53, to the bifurcated upper end of the plunger 27. The adjacent ends of the links 50 and 52 are pivoted together, as indicated at 54. These ends of the links 50 and 52 are provided with yoke portions which straddle (Figure 4) the flat end portion 55 of a piston rod 56. The pivot 54 also serves to connect the links to the rod 56, as indicated. The piston rod 56 extends through aligning vertical slots 57 and 58 formed at diametrically opposed points in the housing portion 38. The slot 57 is large enough to permit the required movement of the toggle joint 49, and both slots are of sufficient height to permit limited vertical movement of piston rod 56.

Figure 3:
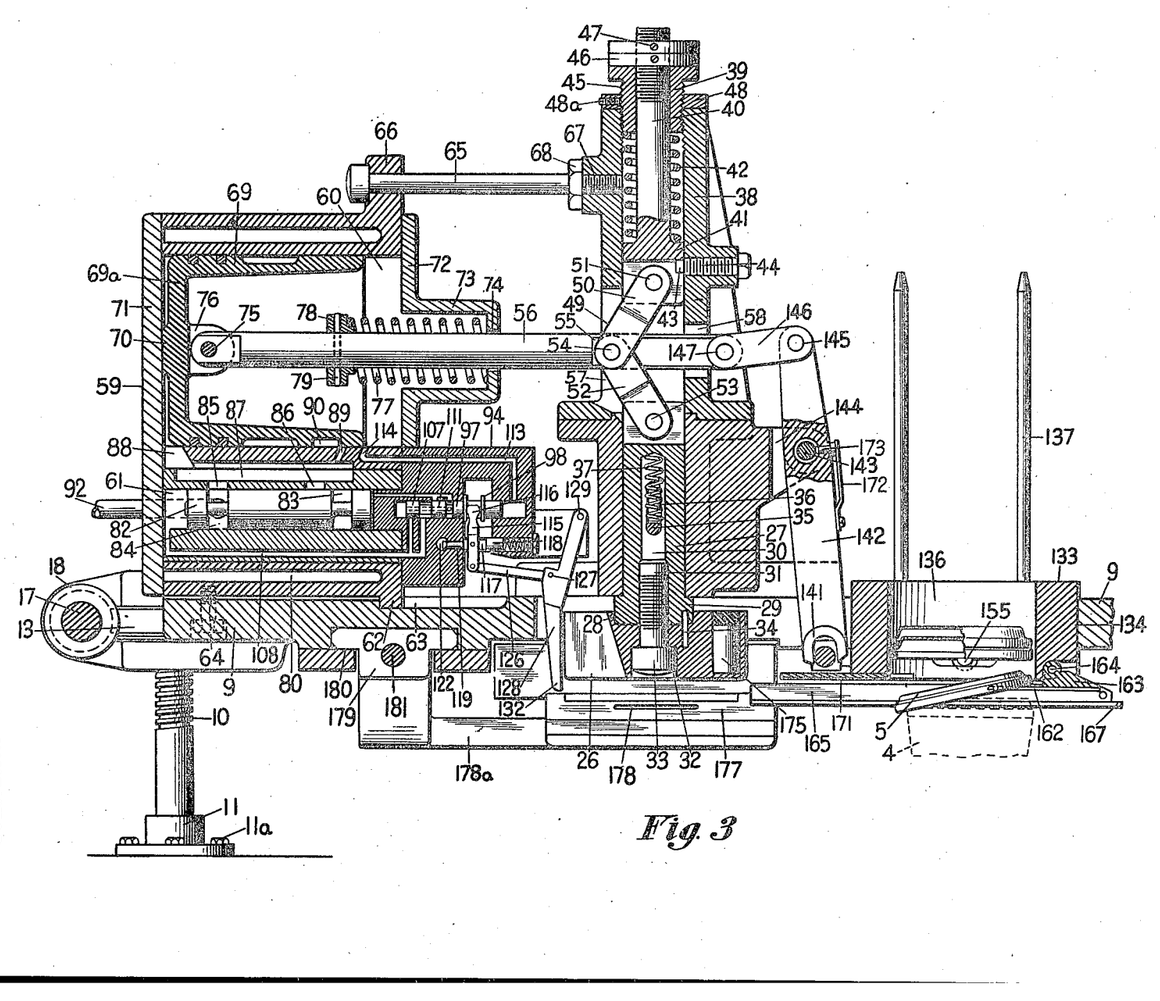
Figure 3 is a vertical sectional view of the sealing head unit and its actuating mechanism and showing the cap feeding and applying unit in association therewith.
Figures 4, 4A:
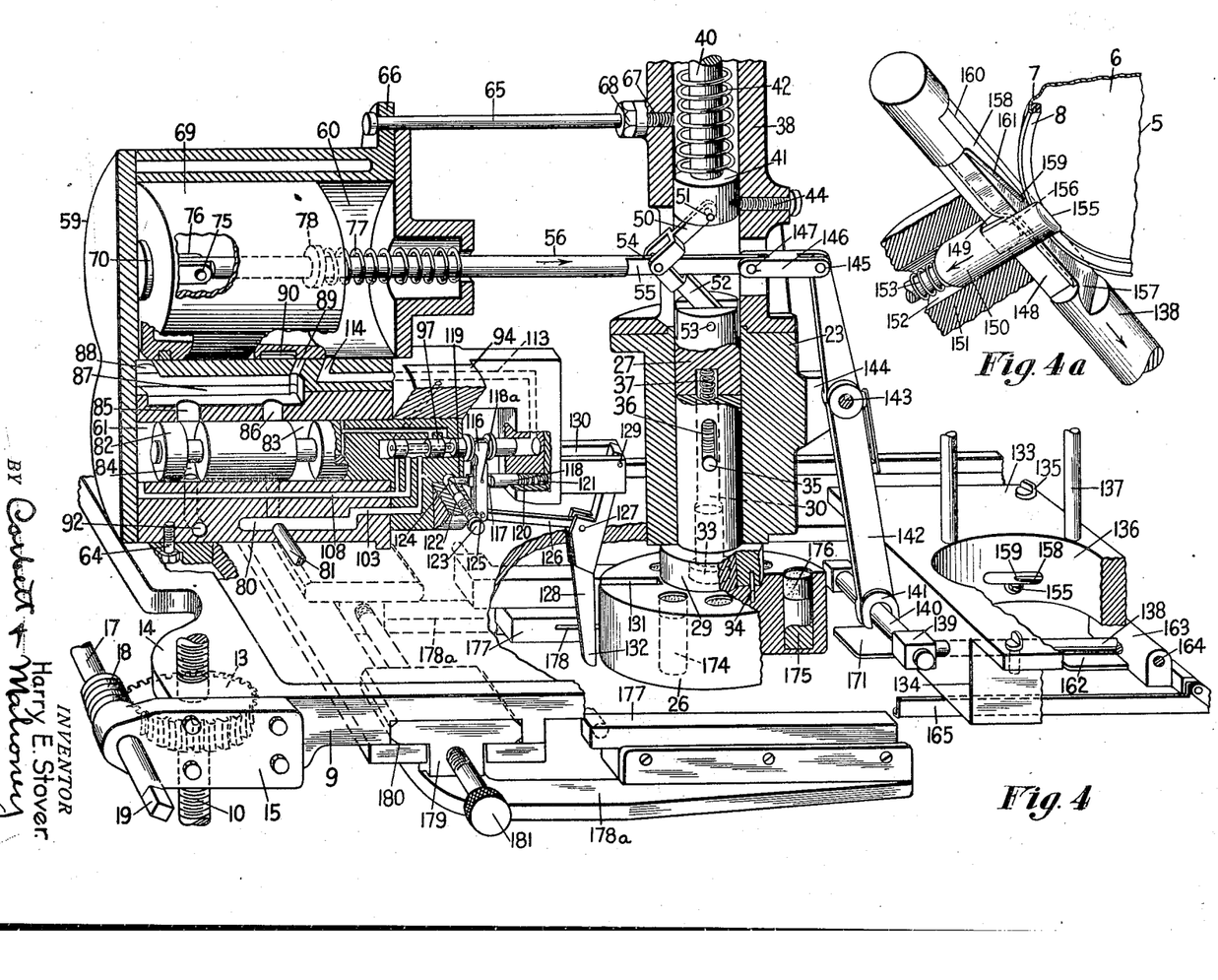
Figure 4 is a view partly in perspective and partly in vertical section illustrating the sealing head unit and the cap feeding unit.
Figure 4a is a perspective view showing a separating wedge of the cap-feeding unit.

The actuating mechanism for the sealing head 26 is normally in the condition illustrated in Figures 3 and 4. The plunger 40 will be held in its lowermost position by the spring 42. The plunger 27 will be held in its uppermost position by the spring 37. The toggle joint 49 will be in the condition illustrated, that is, with its links at an angle to each other. It will be apparent that if the piston rod 56 is moved to the right (Figures 3 and 4), the toggle joint 49 will be straightened out. This will force the plunger 27 downwardly against the action of spring 37 and, consequently, will force the sealing head 26 downwardly. As soon as the piston rod 56 moves to the left, the spring 37 will return member 26 to its uppermost position. The spring-pressed plunger 40 is provided to limit the downward force exerted on the plunger 27 to a predetermined maximum so as to prevent injury to the container being sealed. This predetermined maximum is determined by the initial adjustment of the distance between the lower end of collar 39 and the flange 41, which varies the downward force exerted by the spring 42. When the downward force created by the toggle 49 on the plunger 27 reaches the predetermined maximum, the plunger 40 will be forced upwardly against the resistance of the spring 42. Consequently, the pressure exerted on plunger 27 will not be excessive. It will be apparent that during operation of the toggle joint, the piston rod 56 will move vertically to a limited extent. Adjusting the plunger unit vertically by means of the member 39, as previously described, will vary the extent of the downward movement of the plunger 27 and, consequently, of the member 26. Thus, the extent of the downward movement of member 26 may be readily adjusted.

For controlling movement of the piston rod 56, I provide the mechanism now to be described. This mechanism comprises a fluid-operated cylinder and piston unit 59. This unit 59 includes a housing which has a large cylinder bore 60 formed in its upper portion and a small cylinder bore 61 formed in its lower portion. The bores 60 and 61 are horizontally disposed and are parallel with each other. The housing 59 is mounted on the upper surface of the plate 9. It is provided with a flattened lower surface which has a downwardly projecting lug 62 formed thereon that fits into a groove 63 formed in the upper surface of plate 9. The housing is disposed directly adjacent the housing portions 23 and 38 of the sealing head operating mechanism. A bolt 64 is passed upwardly through the plate 9 and is threaded into the unit 59 to hold it in position. A large bolt 65 is passed horizontally through an upstanding lug 66 on the unit 59 and has its outer end threaded into a boss on the housing portion 38, as at 67. A lock nut 68 is provided for locking the bolt in position. Thus, it will be apparent that the unit 59 is held firmly in position.

The bore 60 has a hollow cylinder 69 slidably mounted therein. This cylinder 69 has an abutment 70 formed on its end wall 69a which is adapted to contact with the head 71 disposed at the left hand end of the unit 59 and which will serve to keep the end of the piston spaced slightly from the inner surface of the head 71. A cap 72 is bolted to the other end of the unit 59 and is provided with a cylindrical extension 73 having an opening 74 formed in the outer wall thereof. The piston rod 56 passes inwardly through this opening into the interior of the bore 60. The inner end of the piston rod 56 is flattened and is pivotally connected at 75 to a bifurcated lug 76 formed on the interior surface of the end wall of the piston. The opening 74 is larger than the piston rod 56 so as to permit limited movement of the piston rod therein. A compression spring 77 is disposed within the bore 60 and the extension 73 of cap 72 in surrounding relationship to the rod 56. One end of the spring bears against the end wall of the extension 73 while the opposite end bears against a collar 78, which is mounted on the rod 56 in a fixed position by means of the transverse pin 79. It will be apparent that this spring normally tends to force the piston 69 to the left so that the abutment 70 contacts with the head 71. Consequently, this will also keep the toggle joint 49 in the condition illustrated in Figures 3 and 4.

I preferably employ steam as the fluid for moving the piston 69 from the position indicated in Figures 3 and 4. The housing 59 has a steam jacket 80 formed in the wall thereof and extending completely around the housing. A main steam line 81 is adapted to convey steam into this jacket. This jacket serves to prevent or decrease condensation of the steam within the housing 59. The line 81 may be connected to any suitable source of supply.

The bore 61 has a piston type valve 82 mounted for axial movement therein, as shown best in Figures 3 to 6. This piston valve 82 is adapted to control the supply of steam to and exhaust of steam from the cylinder bore 60. Adjacent one of its ends the piston valve 82 is provided with an annular chamber 83 and adjacent its opposite end the piston valve 82 is provided with an annular chamber 84. An exhaust opening 85 and an inlet opening 86 are provided in the wall of the bore 61 at longitudinally spaced points and communicate with a longitudinal passageway 87. This passageway has one end communicating with an opening 88 which leads into the cylinder bore 60 adjacent the head 71. The opposite end of the passageway 87 communicates with an opening 89 which leads through the wall of the bore 60. The outer end of this opening 89 is covered by the piston 69, when in the position illustrated in Figure 5. However, when the piston moves to the right, the opening 89 communicates with a longitudinally extending groove 90 formed in the periphery of the piston 69. When the piston 82 is in the position indicated in Figure 5, the exhaust opening 85 will be in communication with the annular chamber 84 of the piston, while the inlet opening 86 will be covered by the piston. At a point in alignment with the exhaust opening 85 is an exhaust opening 91 formed in the wall of the bore 61. This opening 91 communicates with an exhaust conduit 92. With the piston 82 in the position indicated in Figure 5, steam will exhaust from the left hand end of the cylinder bore 60, through exhaust opening 85, annular chamber 84 and exhaust opening 91. At a point in alignment with the inlet 86, is an inlet opening 93 formed in the wall of the bore 61 and communicating with the chamber 80. The piston 82, when in the position indicated in Figure 5, will cover the inlet openings 86 and 93. Consequently, steam will not be supplied to the cylinder bore 60.

For controlling movement of the piston valve 82, I provide a valve mounted in an extension 94 of the housing 59. This extension is provided with a vertically disposed slot 95. A cylindrical bore 96 is formed in the main portion of the extension 94 while a cylindrical bore 96a is formed in the end portion of the extension. The portions 96 and 96a are in axial alignment and receive a piston 97, which is mounted for axial movement therein. The portion of the piston extending within the slot 95 carries a pair of spaced collars 98 which serve to limit movement of the piston. The portion of the piston 97 which is disposed in the bore 96 has an annular chamber 99 formed therein and annular chamber 100 formed therein in axial spaced relationship. The piston 97 is also provided with a passageway 101 extending axially therethrough and which has one end communicating with the chamber 100, as at 102, and its opposite end communicating with the portion of the bore 96 disposed beyond the left hand end of the piston. A steam passageway 103 connects the steam chamber 80 to the annular chamber 99 formed in the piston 97. An exhaust passageway 104 connects the left hand end of bore 96 to the exhaust conduit 92. Spaced passageways 105 and 106 communicate with the bore 96 and, when the piston 97 is in the position indicated in Figure 5, the end 107 of the piston covers the end of passageway 105 while the end of passageway 106 communicates with the chamber 99 in the piston. These passageways 105 and 106 are connected to a passageway 108 which is connected to the left hand end of the cylinder bore 61. Axially spaced passageways 109 and 110 communicate with the bore 96 and, when the piston 97 is in the position indicated in Figure 5, the central portion 111 thereof covers the end of passageway 109 and the passageway 110 communicates with the annular chamber 100 of the piston 97. The passageways 109 and 110 are connected to a passageway 112 which is connected to the right hand end of the bore 61. A passageway 113 leads from the bore 96a to an opening 114 in the wall of bore 60 which is uncovered by the piston 69, when the piston is in the position indicated in Figure 5, and which is so disposed that when the piston 69 moves to the right, it will communicate with the groove 90, thus connecting openings 89 and 114.

Figure 5:
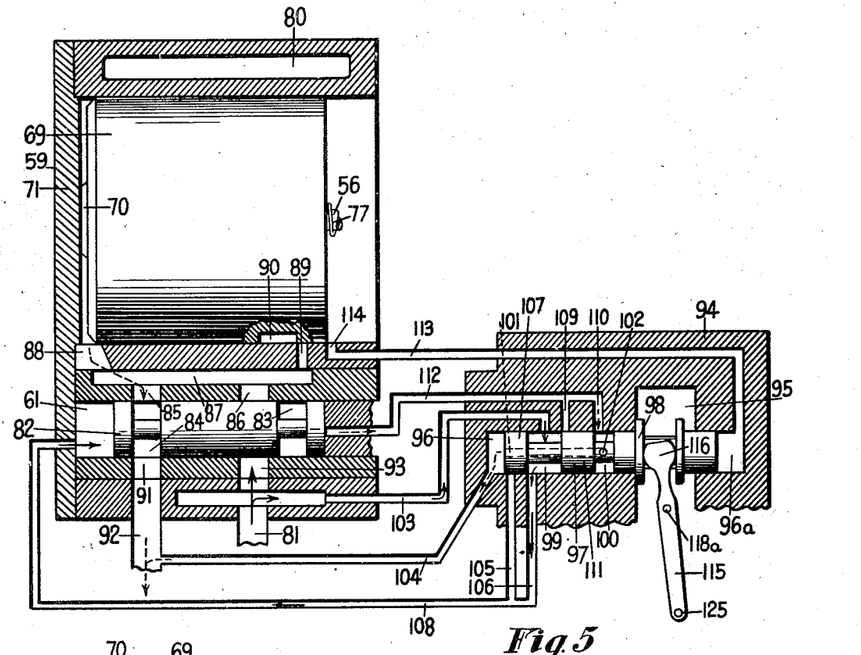
Figure 5 is a diagrammatic view of the cylinder and piston unit, which actuates the sealing head, and the control valves, the valves being shown in the positions they occupy when the sealing head is not actuated.

It will be apparent that with the piston 97 in the position indicated in Figure 5, steam will flow from the chamber 80, through the passageway 103, through annular chamber 99 of piston 97, through passageways 106 and 108, to the left hand end of the bore 61, and will force the piston 82 to the right. At the same time, any steam in the right hand end of the bore 61 will exhaust through passageway 112, passageway 110, annular chamber 100, bore 101, bore 96, passageway 104 and exhaust conduit 92. Thus, the inlet openings 86 and 93 will be covered by the piston 82, while the outlet openings 85 and 91 will be in communication with each other, through the medium of annular chamber 84 of piston 82. Consequently, steam from the left hand end of the cylinder bore 60 will exhaust through the exhaust conduit 92. Thus, the spring 77 will be permitted to return the piston 69 to the position indicated in Figure 5.

Figure 6:
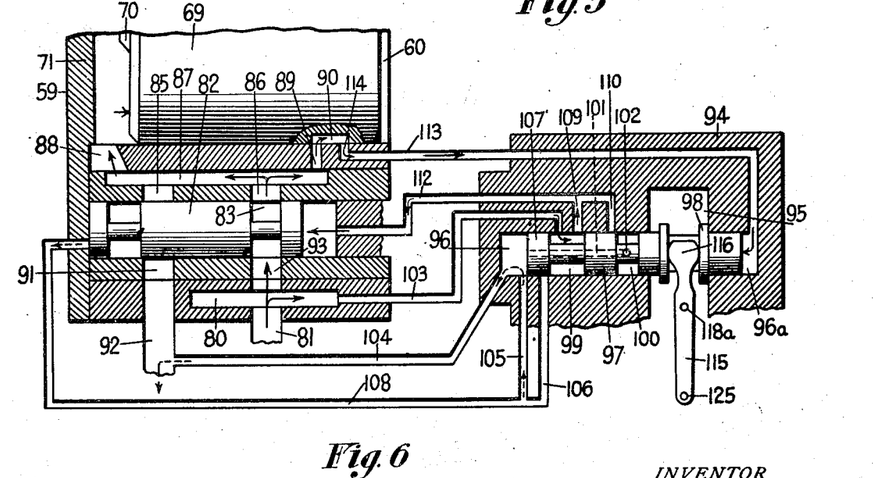
Figure 6 is a similar view but showing the valves in the positions they occupy when the sealing head is actuated.

However, if the piston 97 is moved to the right, as indicated in Figure 6, steam will be supplied to the left hand end of the cylinder bore 60 to move the piston 69 to the right. It will be apparent that when the piston 97 is moved to the right, steam will flow from the passageway 103, through the annular chamber 99 in piston 97, through the passageway 109, through passageway 112 (the passageway 110 having its end closed at this time by the portion 111 of the piston) to the right hand end of the bore 61, which will cause the piston 82 to move to the left. At the same time, the steam in the left hand end of the bore 61 will exhaust through the passageway 108, through passageway 105 (the end of passageway 106 being closed by the end 107 of piston 97 at this time) through the left hand end of bore 96 and through passageway 104 (the axial bore 101 being in effect closed since the annular chamber 100 is completely covered by the wall of bore 96) to the exhaust conduit 92. When the piston 82 is moved to the position indicated in Figure 6, the inlet openings 93 and 86 communicate with each other through the medium of the annular chamber 83 of the piston 82, while the exhaust openings 85 and 91 are covered by the piston. Consequently, steam will flow from the chamber 80 into the passageway 87 and through opening 88 into the left hand end of the bore 60. This will force the piston 69 to the right. When the piston 69 moves to the right sufficiently, the opening 89 communicates with the opening 114 through groove 90. This will permit steam to flow into passageway 113 and into the bore 96a and will force the piston 97 back to the position indicated in Figure 5.

The piston 97 must be moved to the right mechanically by means of a lever 115. This will move the piston 69 to the right, as described above. However, as soon as the piston 69 moves sufficiently, the piston 97 will be returned to its original position by steam pressure, as described above. Thus, movement of the piston 97 to the right is controlled mechanically while movement of the piston to the left is accomplished automatically by steam pressure.

For moving the piston 97 to the right, I provide the pivoted lever 115, as previously described. This lever has a yoke portion 116 on its upper end which engages the piston 97 between the collars 98, as shown best in Figures 3 and 4. The lever 115 straddles a flattened portion 117 of a small plunger 118 and is pivotally connected thereto as at 118a. The plunger 118 is disposed for axial movement in aligning bores 119 and 120 formed in the main portion and end portion, respectively of the extension 94. A compression spring 121 is provided in the bore 120 for normally forcing the plunger 118 to the left. A transverse bore 122 is provided at the inner end of bore 119 and at right angles thereto. This transverse bore has a screw member threaded therein which has a pointed inner end 124 which contacts with the chamfered inner end of the plunger 118. The spring 121 normally keeps the plunger in contact with the point 124 of the screw 123. It will be apparent that by adjusting the screw 123 in or out, the plunger 118 may be accurately adjusted axially of itself, the point 124 serving as a wedge member contacting the end of plunger 118. This adjustment is provided for a purpose which will be explained later.

The lower end of the lever 115 is pivotally connected, as at 125, to the end of a link 126. This link 126 is pivotally connected, as at 127, to a lever 128 intermediate the ends thereof. The upper end of the lever is pivotally connected, as at 129, to a pair of spaced lugs 130 between which it is disposed. The lugs 130 project outwardly from the extension 94. The lower end of the lever 128 is disposed adjacent the edge of member 26 in alignment with a vertical slot 131 formed therein which is of sufficient width to permit movement of the lever thereinto, if necessary. The lever 128 has a finger portion 132 on its lower end which extends downwardly beyond the lower surface of the member 26, when the member 26 is in its uppermost position. Adjustment of plunger 118 will move the lower end of lever 128, into or out of slot 131, to properly position the finger 132 at the point where the edge of the cap will be disposed when it is carried on the head 26 in sealing position. The proper position of finger 132 will vary with variations in diameters of the caps being used.

The cap feeding and applying unit 2 is illustrated best in Figures 3, 4 and 8 to 10, inclusive. This unit comprises a plate 133 which is suitably bolted to the plate 9 over an extension of the opening 25 in the plate 9. This plate 133 has a portion 134 which extends down into the opening 25. The plate 133 is bolted to the plate 9 by means of wing bolts 135 so that it may be readily removed. The plate 133 is provided with a centrally disposed opening 136 which is in alignment with the sealing head 26. This opening 136 is of the proper size to permit the caps, to be applied to the containers, to drop freely therethrough. The plate 133 carries four upstanding posts 137 which are spaced circumferentially around the opening 136. These posts 137 are adapted to receive a stack of the nested caps.

For controlling the feed of the caps downwardly through the opening 136, I provide the following structure. This structure embodies a pair of cap separating wedge members 138. These wedge members 138 are disposed tangentially to the opening 136, as indicated best in Figure 8. They are mounted for axial movement in the plate 133. The outer ends of these members 138 are connected to block members 139 which receive a transversely extending pin 140. This pin 140 is engaged intermediate its ends by a yoke 141, formed on the lower end of a lever 142, which is vertically disposed. The lever 142 is pivoted at 143 between a pair of lugs 144 projecting from the housing portion 23. The upper end of the lever 142 is pivoted at 145 to the outer bifurcated end of a link 146. The inner bifurcated end of the link 146 is pivoted at 147 to the outer end of the piston rod 56. It will be apparent that when the piston rod 56 reciprocates, it will swing the lever 142 about its pivot 143. Consequently, this will move the members 138 axially.

The members 138 are of the shape shown in the drawings, particularly in Figure 4a. Each of the members 138 has a flat lower surface 148 formed intermediate its ends. This lower flat surface has a cam shoulder 149 formed thereon. Beneath each of the members 138 is a stop finger 150 which is mounted for axial movement in a tubular housing 151 at right angles to the member 138. The tubular housing is disposed in a bore 152 extending radially from the peripheral wall of the opening 136. The outer end of the finger 150 is reduced and has a compression spring 153 associated therewith. This spring normally tends to force the finger 150 inwardly towards the center of opening 136. A nut 154 threaded on the outer end of finger 150 and engaging the outer end of housing 151 limits this inward movement. The inner end of the finger 150 is provided with a flattened portion 155 which normally projects inwardly beyond the wall of the opening 136 and upon which the lowermost cap normally rests. The two fingers 150 will be diametrically opposed and will normally prevent downward movement of the caps through the opening 136. It will be noted that they are spaced above the bottom of the opening.

Above the surface 155 a cam shoulder 156 is formed on the finger 150. This cam surface 156 is in engagement with the cam shoulder 149 of the member 138. When the member 138 is moved in the direction of the arrow (Figure 4a) the cam shoulder 149, engaging cam surface 156, will force the stop finger 150 outwardly against the force of the spring 153. This will withdraw the finger completely from the opening 136 out of engagement with the lowermost cap and will permit the cap to drop. As soon as member 138 is returned again to the position indicated in Figure 4a, the finger 150 will be forced inwardly by the spring 153.

Each of the members 138 also has a flat vertical surface 157 formed thereon intermediate its ends. This surface 157 has a cap separating wedge portion 158 formed thereon but extending only to the point 159, which is almost the mid point of the flat surface 157. As shown best in Figure 8, the projecting portion 155 of stop finger 150 is disposed directly adjacent the point 159 where the wedge portion 158 is formed. This wedge portion 158 is provided with a horizontally disposed upper edge 160 which is spaced above the top surface of portion 155 a distance substantially equal to the thickness of a cap. The lower edge 161 of wedge portion 158 is inclined so that the end 159 of portion 158 is pointed. It will thus be apparent that the lowermost cap will normally be supported by the projecting portions 155 of the stop fingers 150. However, when the members 138 are drawn outwardly by movement of the lever 142, this causes the fingers 150 to be moved so that the portions 155 thereof are withdrawn from the opening 136, permitting the lowermost cap to drop from the opening. At the same time that the portions 155 are withdrawn, the pointed ends 159 of the cam portions 158 pass between the lowermost cap and the cap next above. The wedge-shaped cam portions 158 actually serve to force the lowermost cap downwardly. It is desirable to have this positive action rather than to rely upon gravity, because the caps may tend to stick together. The straight upper edges 160 of the portions 158 will support the cap next above and the entire stack during the time fingers 150 are are in the withdrawn position. As soon as the lever 142 returns the members 138 to their original positions, the portions 155 will again project into the opening 136 and the lowermost cap will rest thereon, since the wedge portions 158 have been moved from beneath the cap which they were previously supporting. Thus, it will be apparent that each time the piston rod 56 is moved outwardly to the right (Figure 4) a single cap will drop through the opening 136.

The cap released from the stack will drop downwardly onto a leaf member 162 which is secured to a block portion 163 that is pivoted by the pivot pin 164 to the lower portion of the plate 133. The leaf member 162 extends beneath the opening 136. Also secured to the block 163, is a pair of parallel tracks 165 which extend forwardly towards the sealing head 26. These tracks 165 are spaced apart a proper distance so that they will support the cap 5 released from the stack. Thus, the cap will be supported in an inclined position, as indicated in Figure 3, by the tracks 165 engaging it at diametrically opposed points and by the leaf member 162 engaging the rear edge thereof. Although the members 165 are spaced a distance such that the cap will rest thereon, they are spaced sufficiently to permit the upper end of the container to pass therebetween, it being understood that the cap is slightly greater in diameter than the upper end of the container.

The tracks 165 are normally held in horizontal position by means of a vertically disposed pin 166 which engages a rearward extension 167 on the block 163. This pin 166 is vertically disposed in an extension 168 of the plate 133. It is provided with a small projection 169 which cooperates with a bayonet slot 170 formed in portion 168. With this structure, the pin may be inserted and rotated and will be locked in position so that it will hold the tracks 165 in horizontal position. Above the forward ends of the tracks 165, a leaf member 171 is disposed which is secured to the lower surface of the plate 133 beyond the opening 136. This leaf 171 extends to a point adjacent the sealing head 26 and is provided in order to preclude accidental movement of a cap up between the plate 133, and associated parts, and the member 26.

It will be apparent that all parts of the cap feeding unit are carried by the plate 133. Consequently, when different sized caps are used, the entire unit may be removed easily and quickly and replaced with a different unit adapted to contain and feed caps of a different size. When removing the cap feeding unit, it is desirable to remove the pivot 143 to permit the lever 142 to be disengaged from the pin 140. Therefore, the pivot 143 is merely held in position by means of a leaf spring 172, secured to the lever, which carries a pin 173 on its upper end that engages an annular groove in the pivot pin 143 and normally prevents axial movement thereof. If a cap becomes bent or damaged and wedges in the guideway formed by the tracks 165, the pin 166 may be removed to permit the tracks 165 to swing downwardly into a vertical position so that the damaged cap can be removed.

When the conveyer moves a container beneath the cap feeding unit 2, the upper end of the container will engage the skirt of the inclined cap disposed in the position indicated in Figure 3. This will move the cap along the tracks 165 with the container. The cap and container will be moved along until they pass beneath the sealing head 26. The sealing head has means associated therewith for lifting the cap slightly from the container. This means comprises a plurality of small magnets 174 which are arranged in circumferentially spaced relationship. An additional magnet 175 is disposed closely adjacent the edge of member 26 which will first be approached by the cap. The magnets are of cylindrical form and are mounted in sockets formed in the head 26 which is of non-magnetic material. These sockets do not extend quite completely through the head 26. The upper end of each socket receives a cylindrical portion 176 of rubber which fits tightly therewithin and tends to hold the magnet in position.

As the container with the cap thereon moves beneath the sealing head 26, the forward edge of the cap will first be lifted by the magnet 175. Continued movement of the container will cause the other magnets to act on the cap to hold it up against the lower surface of the member 26. Even with the cap in firm contact with the member 26, the skirt of the cap will still surround the upper end of the container so that it will be moved along with the container. However, the cap will be spaced sufficiently from the upper end of the container to permit steam to be injected therein in the manner described in the said co-pending application Serial No. 314,299.

The means for injecting the steam into the upper end of the container comprises a pair of steam jet members 177 which are provided with steam slots 178. The members 177 are in spaced parallel relationship and extend along the member 26. The members 177 are carried by arms 178a which are, in turn, carried by guide members 179. These guide members 179 are suitably mounted in guideways 180 on the bottom of plate 9. A screw member 181 has oppositely threaded portions engaging the members 179 and is carried by the plate 9 in such a manner that it will not move axially. It will be understood that by rotating screw 181 the distance between the members 177 may be adjusted. Steam may be supplied to the members 177 in the same manner as described in connection with co-pending application S. N. 314,299.

From the preceding description, the operation of the entire machine will be well understood. The conveyer will be continuously driven and the plate 9 will be adjusted to the proper height above the conveyer depending upon the height of the containers to be sealed. The members 177 will be properly adjusted relative to each other depending upon the diameter of the upper ends of the containers. The cap feeding unit will be of a suitable type to handle caps of the correct size to be applied to the containers. The containers will be placed indiscriminately on the conveyer and will be moved beneath the units 2 and 3. As a container is moved beneath the unit 2, it will withdraw a cap from said unit in the manner previously described. The container with a cap loosely thereon will then be moved beneath the sealing head 26. When the container moves beneath the head 26, the magnets serve to lift the cap against the head 26. However, the upper end of the container will still engage the skirt of the cap and will move it along therewith. As soon as the cap contacts the lower end of the trigger or finger 132, the control valves will be actuated to supply steam to move the piston 69 to the right. This will cause the piston rod 56 to actuate the toggle joint 49 which will, in turn, force the sealing head 26 downwardly. This will force the cap onto the container, as previously indicated. Thus, as the container moves into and reaches sealing position, it will automatically actuate the sealing head unit, provided a cap is disposed on the upper end of the container. Before the cap is forced on the container, the cap is sterilized and the air in the upper end of the container is displaced by steam. This is accomplished by means of the steam jets 177 from which steam continuously issues.

In sealing the cap on the container, forcing of the gasket over the upper end of the container, in itself, serves to hold the cap on the container. However, the condensation of the steam in the container beneath the cap, which occurs immediately, produces a partial vacuum which is the main force serving to hold the cap on the container and which also aids in preventing spoilage of the contents of the container. The sealing occurs substantially simultaneously with the injection of the steam into the container and, consequently, the steam will not have much chance of escaping from the container before it is sealed. During the sealing operation, movement of the container along with the conveyer is interrupted by suitable mechanism associated with the conveyer unit which may be of the type disclosed in Serial No. 314,299 and which is shown in Figure 7 and is designated generally by numeral 1a. However, immediately after the sealing operation occurs, the container will again be moved along with the continuously moving conveyer and will be moved away from sealing position. As previously stated, the container sealing mechanism will not function if a container which has no cap thereon, passes therebeneath.

When the sealing head 26 moves down sufficiently to force the cap downwardly into sealing position on a container, the cap will be out of engagement with the finger 132. Then the mechanism previously described may function to return the finger 132 to its original position. It will be noted that each time the sealing mechanism is actuated, the cap feeding unit is actuated to feed a single cap into position to be engaged by the next container. It will also be noted that low pressure steam can be employed for operating the sealing mechanism, since the toggle joint 49 will serve to multiply the force produced by movement of the piston 69. As previously explained, the extent of the downward movement of member 26 may be varied and the maximum pressure created by such member on the cap and container may be varied.

As previously indicated, the sealing head will not be actuated if a container without a cap is moved therebeneath, because the finger 132 of the actuating lever 128 will not be engaged. Therefore, the upper end of the container will not be damaged.

It will be apparent from the above description that I have provided a greatly simplified apparatus for applying and sealing closures on containers. The caps are positioned on the containers loosely, are lifted slightly and the upper portion of the containers vacuumized and sterilized and simultaneously the caps are sterilized, and then the caps are forced into sealed position on the containers. The containers will be vacuumized and sealed quickly and effectively. Due to the fact that steam is not only used for the sterilizing and vacuumizing operations but is also used as the power for operating the sealing head unit, simplification of the machine is facilitated. The machine can be adjusted readily to operate upon containers of various sizes and to use caps of various sizes.

Many other advantages have been mentioned in connection with the preceding description and will be apparent from the drawings and the following claims.

Having thus described my invention, what I claim is:

1. Apparatus of the type described for sealing containers comprising means for applying a cap loosely on the container, a sealing member adapted to be moved to seal the cap on the container, means for moving said sealing member, said means comprising a fluid-operated cylinder and piston unit, a mechanical connection between said cylinder and piston unit and said sealing member, said mechanical connection serving to increase the pressure developed by said unit as it is applied to said sealing member, and means for causing said cap feeding means to operate in response to actuation of said cylinder and piston unit.

2. Apparatus of the type described for sealing containers comprising means for applying a cap loosely on the container, a sealing member adapted to be moved to seal the cap on the container, means for moving said sealing member, said means comprising a fluid-operated cylinder and piston unit, a mechanical connection between said cylinder and piston unit and said sealing member, said mechanical connection including a toggle joint which serves to transmit the pressure developed by said unit to said sealing member, and means for causing said cap feeding means to operate in response to actuation of said cylinder and piston unit.

3. Apparatus of the type described for sealing containers comprising a support for a container, a sealing member adapted to be moved downwardly relative to said support to force a cap on the container, a cap feeding and applying unit disposed directly adjacent the sealing member, a horizontally disposed cylinder and piston unit for moving said sealing member, said sealing member being carried by a vertically disposed plunger, said cylinder and piston unit being provided with a horizontally disposed piston rod, means for connecting said rod to said plunger and including a toggle joint, said toggle joint having the inner ends of its links hinged to said piston rod, one of said links having its outer end connected to said plunger and the other of said links having its outer end connected to an independent support, and means for connecting said piston rod to said cap feeding and applying unit so that it will also actuate said unit.

4. Apparatus of the type described for sealing containers comprising a continuously moving conveyer, a sealing member spaced above the conveyer and adapted to be moved downwardly relative thereto to force a cap on the container, a cap feeding and applying unit disposed directly adjacent the sealing member and above the conveyer, said unit supporting a cap in position to be engaged by a container on the conveyer before it reaches the sealing member, a horizontally disposed cylinder and piston unit for moving said sealing member, said sealing member being carried by a vertically disposed plunger, said cylinder and piston unit being provided with a horizontally disposed piston rod, means for connecting said rod to said plunger and including a toggle joint, said toggle joint having the inner ends of its links hinged to said piston rod, one of said links having its outer end connected to said plunger and the other of said links having its outer end connected to an independent support, means for connecting said piston rod to said cap feeding and applying unit so that it will also actuate said unit, a valve for controlling the supply of fluid to said cylinder and piston unit, a control member for actuating said valve, said control member being associated with the sealing member so that it will be engaged by a cap on a container moved beneath said sealing member by said conveyer.

5. Apparatus of the type described for sealing containers comprising a support for a container, a sealing member adapted to be moved downwardly relative to said support to force a cap on the container, a horizontally disposed cylinder and piston unit for moving said sealing member, said sealing member being carried by a vertically disposed plunger, said cylinder and piston unit being provided with a horizontally disposed piston rod, means for connecting said rod to said plunger and including a toggle joint, said toggle joint having the inner ends of its links hinged to said piston rod, one of said links having its outer end connected to said plunger and the other of said links having its outer end connected to an independent support, a valve for controlling the supply of fluid to said cylinder and piston unit, a control member for actuating said valve, said control member being associated with the sealing member so that it will be engaged by a cap on a container moved beneath said sealing member.

6. Apparatus of the type described for sealing containers comprising a support for a container, a sealing member adapted to be moved to force a cap on the container, a fluid-operated unit for moving said sealing member, a mechanical connection between said unit and said sealing member, said mechanical connection serving to increase the pressure developed by said unit as it is applied to said sealing member, a valve for controlling the supply of fluid to said unit, a control member for actuating said valve, said control member being so positioned that it will be engaged by a cap on a container moved into position on said support in association with said sealing member.

7. Apparatus of the type described for sealing containers comprising a support for a container, a sealing member adapted to be moved to force a cap on the container, means for moving said sealing member, said means comprising a fluid-operated cylinder and piston unit, a mechanical connection between said unit and said sealing member, said mechanical connection including a toggle joint which serves to transmit the pressure developed by said unit to said sealing member, a valve for controlling the supply of fluid to said unit, a control member for actuating said valve, said control member being so positioned that it will be engaged by a cap on a container moved into position on said support in association with said sealing member.

8. Apparatus of the type described for sealing containers comprising a continuously moving conveyer for supporting containers having caps loosely applied thereto, a sealing member supported above the conveyer and adapted to be moved downwardly relative to the conveyer to force a cap on the container, means for moving said sealing member, said means comprising a fluid-operated cylinder and piston unit, a mechanical connection between said unit and said sealing member, said mechanical connection including a toggle joint which serves to transmit the pressure developed by said unit to said sealing member, a valve for controlling the supply of fluid to said unit, a control member for actuating said valve, said control member being associated with the sealing member and being adapted to be engaged by the cap on a container moved beneath said sealing member by said conveyer.

9. Apparatus of the type described for sealing containers comprising a continuously moving conveyer, a cap feeding and applying unit supported above the conveyer for feeding a cap into position to be engaged by a container supported on the conveyer, a sealing member spaced above the conveyer and disposed directly adjacent said unit, means for moving said sealing member relative to the conveyer, said means comprising a fluid-operated cylinder and piston unit, a mechanical connection between said unit and said sealing member, said mechanical connection including a toggle joint which serves to transmit the pressure developed by said cylinder and piston unit to said sealing member, means connecting said cylinder and piston unit to said cap feeding and applying unit so that it will also actuate said unit, a valve for controlling the supply of fluid to said unit, a control member for actuating said valve, said control member being associated with the sealing member and being adapted to be engaged by the cap on a container moved beneath said sealing head by said conveyer.

10. Apparatus of the type described for sealing containers comprising means for applying a cap loosely on the container, a sealing member adapted to be moved to seal a cap on the container, means for moving said sealing member, said means comprising a fluid-operated unit, a mechanical connection between said unit and said sealing member, said mechanical connection including a toggle joint which serves to transmit the pressure developed by said unit to said sealing member, means for causing said cap-feeding means to operate in response to actuation of said unit, a valve for controlling supply of fluid to said unit, and means associated with said sealing member for actuating said valve when a container with a cap thereon is moved into association with said sealing member.

11. Apparatus of the type described for sealing containers comprising a continuously moving conveyer, a sealing member spaced above the conveyer and adapted to be moved downwardly relative thereto to force a cap on the container, a cap-feeding and applying unit disposed directly adjacent the sealing member and above the conveyer, said unit supporting a cap in position to be engaged by a container on the conveyer before it reaches the sealing unit, a fluid-operated unit for moving said sealing member and having a horizontally disposed actuating rod, said sealing member being carried by a vertically disposed plunger, means for connecting said rod to said plunger and including a toggle joint, said toggle joint having the inner ends of its links hinged to said rod, one of said links having its outer end connected to said plunger and the other of said links having its outer end connected to an independent support, means for connecting said rod to said cap-feeding and applying unit so that it will also actuate said unit, a valve for controlling the supply of fluid to said fluid-operated unit, and means associated with said sealing member for actuating said valve when a container with a cap thereon is moved beneath said sealing member by said conveyer.

12. Apparatus of the type described for sealing containers comprising a continuously moving conveyer for supporting containers having caps loosely applied thereto, a sealing member supported above the conveyer and adapted to be moved downwardly relative to the conveyer to force a cap on the container, means for moving said sealing member, said means comprising a fluid-operated unit, a mechanical connection between said unit and said sealing member, said mechanical connection including a toggle joint which serves to transmit the pressure developed by said unit to said sealing member, a valve for controlling the supply of fluid to said unit, and means associated with said sealing member for actuating said valve when a container with a cap thereon is moved beneath said sealing member by said conveyer.

13. Apparatus of the type described for sealing containers comprising a continuously moving conveyer, a cap-feeding and applying unit supported above the conveyer for feeding a cap into position to be engaged by a container supported on the conveyer, a sealing member spaced above the conveyer and disposed directly adjacent said unit, means for moving said sealing member relative to the conveyer, said means comprising a fluid-operated unit, a mechanical connection between said unit and said sealing member, said mechanical connection including a toggle joint which serves to transmit the pressure developed by said fluid-operated unit to said sealing member, means connecting said fluid-operated unit to said cap-feeding and applying unit so that it will also actuate said unit, a valve for controlling the supply of fluid to said fluid-operated unit, and means associated with said sealing member for actuating said valve when a container with a cap thereon is moved beneath said sealing member by said conveyer.

14. Apparatus of the type described for sealing containers comprising a support for a container, a sealing member adapted to be moved to force a cap on the container, a fluid-operated unit for moving said sealing member, a mechanical connection between said unit and said sealing member, said mechanical connection serving to increase the pressure developed by said unit as it is applied to said sealing member, a valve for controlling the supply of fluid to said unit, and means associated with said sealing member for actuating said valve when a container with a cap thereon is moved into position on said support in association with said sealing member.

15. Apparatus of the type described for sealing containers comprising a support for a container, a sealing member adapted to be moved to force a cap on the container, means for moving said sealing member, said means comprising a fluid-operated unit, a mechanical connection between said unit and said sealing member, said mechanical connection including a toggle joint which serves to transmit the pressure developed by said unit to said sealing member, a valve for controlling the supply of fluid to said unit, and means associated with said sealing member for actuating said valve when a container with a cap thereon is moved into position on said support in association with said sealing member.

16. Apparatus of the type described for sealing containers comprising means for aplying a cap loosely on the container, a sealing member adapted to be moved to seal the cap on the container, means for moving said sealing member, said means comprising a fluid-operated unit, a mechanical connection between said unit and said sealing member, said mechanical connection serving to increase the pressure developed by said unit as it is applied to said sealing member, means for causing said cap-feeding means to operate in response to actuation of said unit, a valve for controlling the supply of fluid to said unit, and means associated with said sealing member for actuating said valve when a container with a cap thereon is moved into association with said sealing member.

17. Apparatus of the type described for sealing containers comprising a support for a container, a sealing member adapted to be moved to force a cap on the container, a fluid-operated unit for moving said sealing member, a mechanical connection between said unit and said sealing member, said mechanical connection including a toggle joint which serves to transmit the pressure developed by said unit to said sealing member, means associated with said toggle joint for limiting the pressure exerted on the container by said sealing member to a predetermined maximum, a valve for controlling supply of fluid to said unit, and means associated with said sealing member for actuating said valve when a container with a cap thereon is moved into position on said support in association with said sealing member.

18. Apparatus of the type described for sealing containers comprising a support for a container, a sealing member adapted to be moved to force a cap on the container, a fluid-operated unit for moving said sealing member, a mechanical connection between said sealing member and said unit, said mechanical connection including a toggle joint which serves to transmit the pressure developed by said unit to said sealing member, adjustable means associated with said toggle joint for limiting the pressure exerted on the container by said sealing member to a predetermined maximum, adjustable means associated with said toggle joint for varying the extent of movement of said sealing member, a valve for controlling the supply of fluid to said unit, and means associated with said sealing member for actuating said valve when a container with a cap thereon is moved into position on said support in association with said sealing member.

19. Apparatus of the type described for sealing containers comprising a suport for a container, a sealing member adapted to be moved downwardly relative to said support to force a cap on the container, a horizontally disposed cylinder and piston unit for moving said sealing member, said sealing member being carried by a vertically disposed plunger, said cylinder and piston unit being provided with a horizontally disposed piston rod, means for connecting said rod to said plunger and including a toggle joint, said toggle joint having the inner ends of its links hinged to said piston rod, one of said links having its outer end connected to said plunger and the other of said links having its outer end connected to an independent support, a valve for controlling the supply of fluid to said cylinder and piston unit, a control member for actuating said valve, said control member being associated with the sealing member so that it will be engaged by a cap on a container moved beneath said sealing member, and fluid actuated means for returning said control member to its original position.

20. Apparatus of the type described for sealing containers comprising a support for a container, a sealing member adapted to be moved to force a cap on the container, a fluid-operated unit for moving said sealing member, a mechanical connection between said unit and said sealing member, said mechanical connection serving to increase the pressure developed by said unit as it is applied to said sealing member, a valve for controlling the supply of fluid to said unit, a control member for actuating said valve, said control member being adapted to be engaged by a cap on a container positioned on said support in association with said sealing member and fluid-actuated means for returning said control member to its original position.

21. Apparatus of the type described for sealing containers comprising a support for a container, a sealing member adapted to be moved to force a cap on the container, means for moving said sealing member, said means comprising a fluid-operated cylinder and piston unit, a mechanical connection between said unit and said sealing member, said mechanical connection including a toggle joint which serves to transmit the pressure developed by said unit to said sealing member, a valve for controlling the supply of fluid to said unit, a control member for actuating said valve, said control member being adapted to be engaged by a cap on a container positioned on said support in association with said sealing member, and fluid-actuated means controlled by said unit for returning said control member to its original position.

22. Apparatus of the type described for sealing containers comprising a continuously moving conveyer for supporting containers having caps loosely applied thereto, a sealing member supported above the conveyer and adapted to be moved downwardly relative to the conveyer to force a cap on the container, means for moving said sealing member, said means comprising a fluid-operated cylinder and piston unit, a mechanical connection between said unit and said sealing member, said mechanical connection including a toggle joint which serves to transmit the pressure developed by said unit to said sealing member, a valve for controlling the supply of fluid to said unit, a control member for actuating said valve, said control member being associated with the sealing member and being adapted to be engaged by the cap on a container moved beneath said sealing member by said conveyer, and fluid-actuated means controlled by said unit for returning said control member to its original position.

23. Apparatus of the type described for sealing containers comprising a continuously moving conveyer, a cap feeding and applying unit supported above the conveyer for feeding a cap into position to be engaged by a container supported on the conveyer, a sealing member spaced above the conveyer and disposed directly adjacent said unit, means for moving said sealing member relative to the conveyer, said means comprising a fluid-operated cylinder and piston unit, a mechanical connection between said unit and said sealing member, said mechanical connection including a toggle joint which serves to transmit the pressure developed by said cylinder and piston unit to said sealing member, a valve for controlling the supply of fluid to said unit, a control member for actuating said valve, said control member being associated with the sealing member and being adapted to be engaged by the cap on a container moved beneath said sealing head by said conveyer, and fluid-actuated means controlled by said cylinder and piston unit for returning said control member to its original position.

24. Apparatus of the type described for sealing containers comprising a support for a container, a sealing member associated with said support, a cylinder and piston unit for moving said sealing member, a valve for controlling the supply of fluid to said cylinder and piston unit, a control member for actuating said valve, said control member being so disposed that it will be engaged by a cap on a container positioned on said support, and fluid-actuated means for returning said valve to its original position.

25. Apparatus of the type described for sealing containers comprising a support for a container, a sealing member associated with said support, a fluid-operated unit for moving said sealing member, a valve for controlling the supply of fluid to said unit, a control member for actuating said valve, said control member being so disposed that it will be engaged by a cap on a container positioned on said support, and fluid-actuated means for returning said valve to its original position.

HARRY E. STOVER.